(12) United States Patent
Gleu

(10) Patent No.: US 8,006,963 B2
(45) Date of Patent: Aug. 30, 2011

(54) WHEEL-GUIDING PNEUMATIC SPRING DAMPER UNIT

(75) Inventor: Jens-Uwe Gleu, Langenhagen (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1114 days.

(21) Appl. No.: 11/792,796

(22) PCT Filed: Nov. 29, 2005

(86) PCT No.: PCT/EP2005/012713
§ 371 (c)(1),
(2), (4) Date: Jun. 11, 2007

(87) PCT Pub. No.: WO2006/061119
PCT Pub. Date: Jun. 15, 2006

(65) Prior Publication Data
US 2008/0223671 A1    Sep. 18, 2008

(30) Foreign Application Priority Data
Dec. 11, 2004   (DE) .......................... 10 2004 059 765

(51) Int. Cl.
*F16F 9/22* (2006.01)
*F16F 5/00* (2006.01)

(52) U.S. Cl. ............... 267/64.25; 267/64.26; 267/64.27; 267/64.24; 267/64.23; 267/64.19

(58) Field of Classification Search ............... 267/64.25, 267/64.26, 64.27, 64.24, 64.23, 64.19
See application file for complete search history.

(56) References Cited

U.S. PATENT DOCUMENTS

| | | | | |
|---|---|---|---|---|
| 2,338,897 A * | 1/1944 | Boulogne et al. | ............. | 267/186 |
| 2,933,308 A * | 4/1960 | McGavern, Jr. et al. | ...... | 267/256 |
| 3,043,582 A * | 7/1962 | Hirtreiter | ................... | 267/64.24 |
| 4,493,481 A * | 1/1985 | Merkle | ....................... | 267/64.27 |
| 4,629,170 A * | 12/1986 | Warmuth, II | ............... | 267/64.27 |
| 5,996,980 A * | 12/1999 | Frey et al. | .................. | 267/64.27 |
| 6,511,057 B1 * | 1/2003 | Berg | ........................ | 267/64.27 |
| 6,536,749 B1 * | 3/2003 | Luhmann et al. | .......... | 267/64.19 |

FOREIGN PATENT DOCUMENTS

| | | |
|---|---|---|
| DE | 1132013 B | 6/1962 |
| DE | 2406835 A1 | 8/1975 |
| DE | 10311263 B3 | 7/2004 |

* cited by examiner

*Primary Examiner* — Bradley King
*Assistant Examiner* — Mahbubur Rashid
(74) *Attorney, Agent, or Firm* — Brinks Hofer Gilson & Lione

(57) ABSTRACT

A pneumatic spring and damper unit (1) has working chambers (2,3) which are filled with compressed air and are partially defined by rolled bellows or corrugated bellows. The working chambers are superimposed and connected through throttle valves, arranged inside a common pot-shaped cylindrical housing (4), and separated by a cylindrical piston (7), in such a way that one working chamber (2) is arranged on the front side of the piston and the other working chamber (3) is arranged on the rear side of the piston. The piston and the piston rod (5) are respectively sealed by roller bellows inside the cylindrical housing and guided therein, and the piston rod and the piston are interconnected by an articulation (6).

10 Claims, 1 Drawing Sheet

WHEEL-GUIDING PNEUMATIC SPRING DAMPER UNIT

BACKGROUND OF THE INVENTION

The invention relates to a pneumatic spring and damper unit, in particular for chassis of vehicles, which is arranged between the bodywork and chassis and has at least two working spaces filled with compressed air, in which the working spaces are each bounded at least partially by movable walls in the form of rolling bellows or corrugated bellows, and the rolling bellows or corrugated bellows roll at least partially on the contours of rotationally symmetrical elements (rolling contours), preferably on housing parts which are embodied as cylindrical surfaces, the working spaces being arranged one on top of the other and being connected to one another by means of throttle valves through which there can be a flow, and in which in the case of spring compression in the main load direction the volume of one working space is reduced and the volume of the other working space is increased or remains unchanged.

DE 103 11 263 B3 2004.07.29 presents a pneumatic spring with pneumatic damping, two working chambers and three rolling bellows being provided. The rolling bellows which is the largest in diameter determines here the spring rate of the pneumatic spring over the spring travel and is arranged between an upper and a lower pot-shaped housing part. The two further bellows which compensate one another in their effective spring force are arranged between the lower pot-shaped housing part and a rolling tube which is attached within the upper pot-shaped housing part and projects into the lower pot-shaped housing part. Air can flow between the two working spaces via throttle bores in the cylindrical walls of the rolling tube. In this embodiment, the two lower bellows which are arranged in mirror-inverted fashion permit axial guidance of the pneumatic spring, which largely reduces the friction during the spring travel. However, in this system the volume of the two working chambers is decreased in the case of spring compression and increased again in the case of spring extension. As a result of the decrease in the two volumes in the case of spring compression, the pressure, and thus the gas density, increase in the two working chambers, but the dynamic difference in pressure at the throttle valves disadvantageously does not increase. This in turn brings about a level of energy conversion which is only slightly increased even at a relatively high pressure, i.e. relatively little dissipation and thus less damping work.

U.S. Pat. No. 5,180,145 discloses a damper which operates in particular with an electrorheological fluid and has an upper and a lower working space which are each bounded by rolling bellows. The damper permits a relatively large degree of travel despite the reduced overall height, and in an embodiment which is disclosed in said document it can also be combined with a simple pneumatic spring whose single working space is also partially bounded toward the outside by a rolling bellows. However, the combination of dampers and springs which operate with respectively different media increases the complexity and thus the cost of the component. In addition, the recycling of, in particular, electrorheological fluids gives rise to possible problems in the life cycle management.

DE 34 36 664 A1 discloses a diaphragm pneumatic spring which also provides suspension and damping and has two working chambers of different sizes, which are each bounded toward the outside partially by rolling bellows. The rolling bellows are supported and roll here on external cylinder surfaces of housing parts which are axially movable and embodied as hollow pistons. The working chambers which are of different sizes are divided by a wall which is provided with throttle openings. Air can flow from one working chamber into the other through the throttle openings, the resulting dissipation producing the damping work. However, in the basic design of the diaphragm pneumatic spring, in which the housing parts which are embodied as hollow pistons are connected to a central rod which is guided in a dividing wall, said diaphragm pneumatic spring is subject to considerable friction losses in this guidance. As a result, inter alia, a minimum force is necessary which has to be reached in order to counteract a spring movement/spring effect at all. Below such a minimum force, all the vibrations are transmitted in an undamped and unsprung fashion. A further embodiment which is shown there, in which the rigid connecting rod which is guided in the dividing wall is replaced by an external frame is virtually unusable in cardanic suspensions, in particular of vehicles, due to its overall size.

The German laid-open patent application DE 24 06 835 discloses a spring and damping device in which two working spaces, specifically a damper space and a spring space, are connected to one another via throttle valves. The two working spaces are bounded at least partially by movable walls in the form of corrugated bellows or rolling bellows and can therefore accommodate different volumes. In contrast to the pneumatic spring disclosed in DE 103 11 263 B3 2004.07.29, in the case of spring compression the volume of the spring space is reduced here and the volume of the damper space increased, and the reverse respectively applies in the case of spring extension. Inherent to such a system is the fact that the damping effect/damping work increases as the load increases, while normal hydraulic damping is designed for just one load stage and changes (decreases) acutely if, for example, the load is increased. However, if the load increases in the spring and damping device disclosed in the German laid-open patent application DE 24 06 835, the gas pressure in the spring space and in the damping space rises and leads, owing to the associated increase in the gas density, to an increase in the dynamic pressure difference at the throttle valves. This in turn brings about an increased conversion of energy, i.e. increased dissipation and thus greater damping work. A disadvantage here is also a perceptible degree of friction in the system of all the embodiments presented, as a result of which, inter alia, a minimum force becomes necessary to activate the spring-damper system.

DE 101 15 980 discloses a gas spring-damper unit with a piston which can be displaced in a cylinder housing, is sealed with respect to the latter and divides two working spaces. In this context, the suspension space or spring damper space which lies on the front side of the piston becomes smaller in the case of spring compression. The damper space which is located on the rear side of the piston and includes the piston rod is increased in the case of spring compression, and vice versa. The damper space is partially bounded toward the outside by a rolling bellows. The throttle valves which are located in the piston are configured here in such a way that a different flow resistance is present depending on the through-flow direction, and the location of the changeover from laminar flow to turbulent flow is adapted. The problem of friction is also not sufficiently solved here by the guidance of the piston in the cylinder.

The same applies to the device disclosed in DE 199 32 717 A1. Here too, there is a gas spring-damper unit with a sealed piston which can be displaced in a cylinder housing and divides two working spaces. The suspension space or spring damper space located on the front side of the piston becomes smaller in the case of spring compression, while the damper space which is located on the rear side of the piston and contains the piston rod becomes larger in the case of spring compression, and vice versa. The damper space is partially bounded toward the outside by a rolling bellows. The throttle valves which are located in the piston are configured here as valves which are loaded with spring disks, the spring disks and valve cross sections being embodied as a function of the throughflow direction.

However, all the solutions known in the prior art are subject to the disadvantage that transverse forces acting on the pneumatic springs or pneumatic dampers, i.e. chassis forces which are normal to the axis of the pneumatic springs, cannot be transmitted since there is either no sufficient axial guidance or else damage could occur to the components. Pneumatic springs or pneumatic dampers of conventional design are therefore not able to perform a wheel guidance function within a chassis. Essentially for this reason, and of course also due to their overall size, pneumatic dampers have hardly been used hitherto in McPherson struts.

For the invention, the object has therefore been to make available a pneumatic spring and damper unit whose installation space is small and which is also suitable, for example, for a passenger car, which can be installed without additional structural expenditure in the installation space of conventional spring and damping devices, which does not have any friction—in particular has no dry friction—which can lead to acoustic problems or requires a minimum force to activate the spring-damper system, and which pneumatic spring and damper unit also operates with just one medium, can be configured for different load situations by simple measures and is in particular capable of absorbing transverse forces, thus making wheel guidance possible.

SUMMARY OF THE INVENTION

This object is achieved in that the working spaces are arranged within a common, pot-shaped, rotationally symmetrical housing and are separated by a rotationally symmetrical piston which is axially movable within the housing and is located at the head end of a piston rod, with the result that a working space is arranged at the front side of the piston and at least one other working space is arranged toward the rear side of the piston. The piston is sealed and guided by rolling bellows within the housing, and the external surface of the piston and the internal surface of the cylinder are each formed at least partially as rotationally symmetrical rolling contours. and in that the piston rod and the piston are connected to one another by means of a joint.

Such a pneumatic spring and damper unit has a low overall size even under high stresses and avoids any perceptible friction through the separation and sealing of the piston and the piston rod in each case by rolling bellows within the cylindrical housing and ensures immediate and comfortable "starting". In addition, the arrangement within a single common pot-shaped rotationally symmetrical housing permits encapsulation which is facilitated compared to raw ambient conditions, for example by means of corrugated bellows between the cylindrical housing and piston rod or connecting points.

Furthermore, transverse forces from the chassis can be absorbed with a pneumatic spring and damper unit according to the invention. The guidance of the piston with bellows and the articulated connection between the piston and the piston rod even eliminates the need for costly, so-called "transverse force compensation" which is necessary in conventional pneumatic springs with hydraulic dampers. The term is understood to refer to measures which, at each spring compression point and spring extension point, cause the line of action of the spring force, the line of action of the resultant of the wheel contact and the lateral guiding force of the wheel and the line of action of the transverse link force, or of the corresponding resultant which is present when there are a plurality of transverse links, to intersect at a point. This may be done, for example, in a relatively costly fashion by corresponding embodiments of guide devices of the spring. If, on the other hand, a transverse force compensation is present only in the design state, i.e. in the static state of rest without spring compression or spring extension, even minor amendments to this force configuration owing to spring movements in conventional systems cause considerable flexural loads and thus give rise to high, damaging friction in the damper between the piston and damper tube as well as large transmissions of noise.

One advantageous development consists in the piston rod and the piston being connected to one another by means of a cardanically acting rotary joint, preferably by means of a ball and socket joint. With such a joint, a maximum tolerance with respect to deviations relating to the transverse force compensation is achieved and the need to absorb a rotational movement in other components, for example by means of a separate rotatable head bearing between the vehicle body and strut unit, is eliminated.

A further advantageous embodiment consists in the fact that the piston rod is mounted in an articulated fashion within the piston, the piston being partially embodied as a hollow element, preferably as a hollow cylinder, and enclosing the piston rod in its end region at a distance. As a result, a further reduction in the overall height is achieved, which, particularly in combination with an embodiment in which the piston has a larger external diameter in the region located toward the front side of the piston than in the region which is located toward the rear side of the piston and which is essentially hollow cylindrical, leads to the fact that the volumes of the working spaces can be matched in an interacting fashion to the overall height in such a way that for the first time it becomes possible to combine a pneumatic spring and damper unit with, for example, a McPherson spring strut. As a result, completely new possibilities in the configuration of wheel housings and bodywork parts can be obtained without dispensing with the comfort of pneumatic damping.

A further advantageous embodiment consists in the fact that a first rolling bellows which forms a seal between the piston and housing and is opened to the front side of the piston and thus to the working space arranged on the front side of the piston, and a second rolling bellows which forms a seal between the piston and housing and is opened to the rear side of the piston and thus to the working space arranged at the rear side of the piston, are arranged in the region of the larger external diameter, and in that a third rolling bellows which forms a seal between the piston and the housing is arranged in the region of the smaller external diameter and is opened to the working space arranged at the rear side of the piston and is arranged in a mirror-inverted fashion with respect to the second rolling bellows.

An embodiment with three bellows which are arranged in such a way permits precise and reliable guidance of the piston within the pot-shaped housing which is connected, for example, to the vehicle body. Such an embodiment proves to be particularly robust in particular when absorbing transverse forces which also act on the pneumatic spring and damper unit.

Since the first rolling bellows which seals the front side of the piston is open toward the front side of the piston and as a result of the inventive embodiment of the second and third rolling bellows, the first and second rolling bellows use at least to a certain extent the same rotationally symmetrical rolling contour on the external surface of the piston, which further reduces the overall size.

A further advantageous embodiment consists in the fact that the first and second rolling bellows have essentially the same effective diameters, in particular if the respective effective diameter of the first and second rolling bellows is larger than the effective diameter of the third rolling bellows.

If the working spaces which are located one on top of the other and are produced by such an arrangement of the rolling bellows in the pneumatic spring and damper unit according to the invention and the "effective diameters" which are determined by the rolling bellows geometry are considered, the first and second rolling bellows which are located on the piston essentially compensate one another in their direction and magnitude of force in the steady state, that is to say when there is static loading of the pneumatic spring and damper unit and pressure equalization between the two working chambers. As a result, the effective bearing spring is formed by interaction between the components, essentially using the third rolling bellows, and their bearing force is also determined by the effective diameter of the third rolling bellows.

In a good approximation, the working space which is located on the rear side of the piston and surrounds the piston rod and is bounded, inter alia, by the second and third rolling bellows, is therefore to be considered to be a "suspension space". In contrast, the working space which is located on the front side of the piston and bounded, inter alia, by the first rolling bellows can be referred to as a "damping space". However, such a simplifying division of the working spaces into "spring space" and "damping space" describes only the main functions and the essential properties. It goes without saying that both working spaces have both suspension properties and damping properties in the dynamic state.

In the pneumatic spring and damper unit according to the invention, in contrast to the previously known pneumatic damping systems, the volume of the damping space is therefore reduced in the case of spring compression in the main load direction, specifically in the axial direction of the pneumatic spring and damper unit, while—depending on the structural interpretation—the volume of the suspension space increases or remains unchanged.

The volumes which are formed in this way and the diameters which are effective for the rolling bellows produce a large damping work relative to the overall size or maintain the size of the desired damping work with a reduced overall spatial volume.

A further advantageous embodiment consists in the fact that the external surface of the rotationally symmetrical piston is formed at least partially and preferably as a cone envelope in the region of the larger external diameter, and the first and second rolling bellows have different effective diameters. The advantageous embodiment is particularly supported if the diameters of the first and second rolling bellows are respectively larger than the effective diameter of the third rolling bellows. As a result of the difference in area (circular ring area) arising in this way and formed by the different effective diameters of the first and second rolling bellows, a differential force which acts on the piston and can be adjusted in the direction and magnitude of the force can be produced, with which differential force it is possible to correspond to particular requirements in terms of loading or geometry of the system as a whole.

This can be advantageously implemented by virtue of the fact that the effective diameter of the first rolling bellows is smaller than the effective diameter of the second rolling bellows. The resulting differential force thus additionally acts in the load direction, that is to say thus "pulls" the piston deeper into the top-shaped cylindrical housing counter to the spring force generated by the third rolling bellows, and attempts to shorten the pneumatic spring and damper unit. This can be counteracted by a higher operating pressure or by an increase in the third rolling bellows, that is to say by increasing the effective diameter of the third rolling bellows. The latter gives rise to a larger radius in the continuously moved rolling bellows corrugation and thus to a considerable lengthening of the service life. This embodiment of the pneumatic spring and damper unit therefore permits a plurality of structural adaptations and degrees of freedom without changing the overall size, accompanied by the largest possible use of the "identical component principle", i.e. by using as many identical components as possible for a large number of design variants.

A further advantageous embodiment consists in the fact that the pot-shaped housing is preferably fixed to the vehicle body in the upper region, and the piston rod can be attached to a wheel suspension in the lower region. As a result, in particular when the pneumatic spring and damper unit is used in chassis of passenger cars, it is located in a protected fashion in the wheel house and in most installation situations it fits excellently into the installation space (package) which is usually provided for it.

A further advantageous embodiment consists in the fact that the throttle valves through which there can be a flow are embodied as switchable or controllable valves and are arranged within the piston which separates the working spaces. In particular, when they are applied in chassis of motor vehicles it is desirable to perform open-loop or closed-loop control of the damping work and thus also integrate it into the entire vehicle control system. In situations which are critical in terms of safety such as, for example, in the case of full braking, an antilock brake system (ABS) or an electronic stability program (ESP) can then support adjustable damping of the front and rear axles.

The invention will be explained in more detail by means of an exemplary embodiment.

DETAILED DESCRIPTION OF THE DRAWINGS

Figure 1:
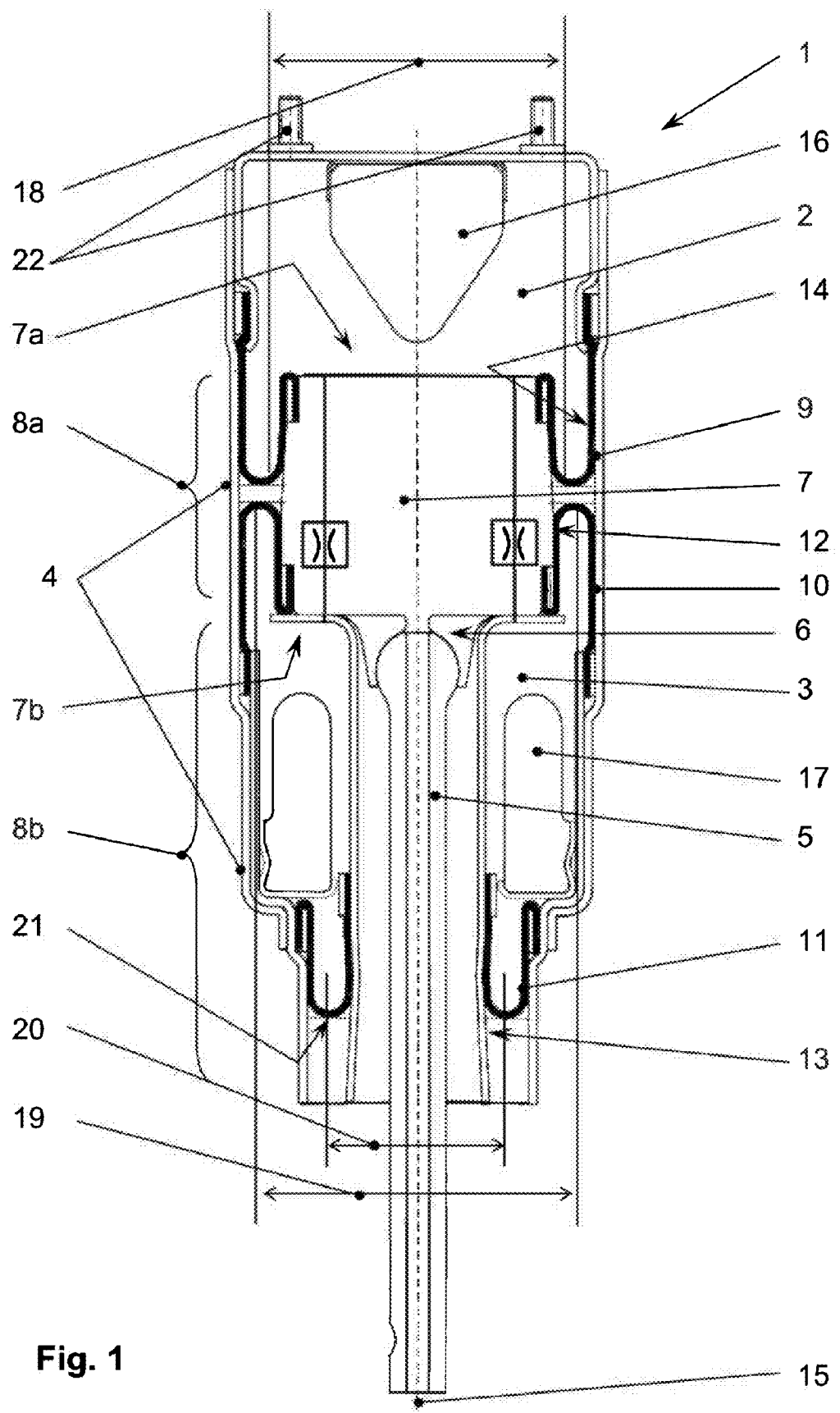
FIG. 1 shows a pneumatic spring and damper unit according to the invention for a chassis with a passenger car with pneumatic suspension with wheel-guiding spring struts.

FIG. 1 shows a pneumatic spring and damper unit 1 according to the invention for a chassis with a passenger car with pneumatic suspension with wheel-guiding spring struts. The pneumatic spring and damper unit has two working spaces 2 and 3 which are filled with compressed air. The compressed air is fed in a known fashion into the working spaces via a compressor (not illustrated here in more detail) through associated valves and lines and can also be let out via this system. A pneumatic spring system or level control system is usually composed of a compressed air system/compressed air supply and four pneumatic spring modules, namely one for each wheel, and is controlled in its entirety by means of a control device.

The working spaces 2 and 3 are arranged in a common pot-shaped housing 4—of cylindrical design here—and separated by a piston 7 which is mounted at the head end of a piston rod 5 in a ball and socket joint 6 and is also of cylindrical design here. The piston 7 is axially movable within the housing 4. Throttle valves (not illustrated here in more detail) which can be open-loop controlled are arranged within the piston 7, via which throttle valves the two working spaces 2 and 3 are connected. The front side 7a of the piston 7 has an essentially circular surface.

The piston is embodied here in its lower region as a hollow element, here as a hollow cylinder, and encloses, at a necessary distance, the piston rod 5 in its end region. The housing 4 is composed here of a region 8a which is located toward the front side of the piston and has a larger external diameter, and of a region 8b which is located toward the rear side of the piston and has a smaller external diameter. The region 8b also corresponds in this case approximately to the length of the hollow cylindrical embodiment of the piston. The rear side 7b of the piston is produced by the sudden increase in the diameter in the piston 7 and has a surface essentially in the shape of a circular ring.

The piston 7 is sealed and guided within the housing by rolling bellows 9, 10 and 11. The external surfaces 12 and 13 of the piston and the internal surface 14 of the housing are each embodied as rotationally symmetrical rolling contours by means of the region which is necessary for the rolling of the rolling bellows.

In the region of the larger external diameter 8a there is therefore a first rolling bellows 9 which is opened to the front side 7a of the piston and therefore to the upper working space 2 as well as a second rolling bellows 10 which is opened to the rear side 7b of the piston and thus to the lower working space. In the region of the lower external diameter 8b there is thus a third rolling bellows 11 which is opened to the lower working space and is arranged in a mirror-inverted fashion with respect to the second rolling bellows 10.

A corrugated bellows which is located between the end of the housing and the lower connecting point 15 to the chassis, for protecting against ambient conditions, is not illustrated in more detail here.

The pneumatic spring and damper unit also has stops 16 and 17 which are arranged in a sprung fashion and which bound the spring travel in the compression end point or in the extension end point when corresponding loading occurs.

In the region 8a, the rotationally symmetrical contour of the cylindrical piston 7 is embodied as a cone envelope which tapers toward the front side 7a of the piston. As a result, the first rolling bellows 9 and the second rolling bellows 10 have different effective diameters 18 and 19, which are each larger than the effective diameter 20 of the third rolling bellows 11.

The respective effective diameters are formed and influenced here by the interplay between the rotationally symmetrical contours of the piston 7 and of the housing 4 lying opposite one another.

The effective diameter of the first rolling bellows 18 is thus smaller than the effective diameter 19 of the second rolling bellows in this embodiment. The different effective diameters 18 and 19 result in a differential area (circular ring area) which acts on the piston and in this case produces an upwardly directed differential force.

The differential force thus "pulls" the piston deeper into the pot-shaped housing. However, the third rolling bellows 11 has an effective diameter 20 which is made so large that for a given operating pressure the differential force can be absorbed in addition to the static or dynamic loading. However, as a result the third rolling bellows 11 also has a large radius in the continuously moved rolling corrugation 21 and thus a very high load cycle endurance.

As a result of the articulated connection between the piston 7 and piston rod 5, the pneumatic spring and damper unit can be connected directly to the vehicle by means of simple screw connections 22 and without further rotatable connections or additional bearings. There is no longer any need here for a precise equalization of transverse force.

LIST OF REFERENCE NUMERALS (Part of Description)
1 Pneumatic spring and damper unit
2 Working space (damper space)
3 Working space (spring space)
4 Housing
5 Piston rod
6 Ball and socket joint
7 Piston
7a Front side of piston
7b Rear side of piston
8a Piston region with large external diameter
8b Piston region with small external diameter
9-11 Rolling bellows
12-14 Area with rolling contour
15 Connecting point
16, 17 Sprung stop
18-20 Effective diameter
21 Rolling corrugation
22 Connection to vehicle body The inventioned claimed is:

1. A pneumatic spring and damper unit, which is arranged between a vehicle body and a vehicle chassis, the spring and damper unit comprising at least two working spaces filled with compressed air, in which the working spaces are each bounded at least partially by movable walls in the form of rolling bellows, and the rolling bellows roll at least partially on the contours of rotationally symmetrical elements, the working spaces being arranged one on top of the other and being connected to one another by means of throttle valves through which there can be a flow, and with a main load direction, in which the pneumatic spring and damper unit is compressed, the volume of one working space is reduced and the volume of the other working space is increased or remains unchanged, the working spaces (2, 3) being arranged within a common, pot-shaped, rotationally symmetrical housing (4) and separated by a rotationally symmetrical piston (7) with a front side and a rear side, which piston is axially movable within the housing and is located at a head end of a piston rod (5), with one working space (2) being arranged at the front side (7a) of the piston and at least one other working space (3) being arranged towards the rear side (7b) of the piston, the piston being sealed and guided by rolling bellows (9, 10, 11) within the housing, and the external surface (12, 13) of the piston (7) and the internal surface (14) of the housing (4) each being formed at least partially as rotationally symmetrical rolling contours, and the piston rod (5) and the piston (7) being connected to one another by means of a rotary joint.

2. The pneumatic spring and damper unit as claimed in claim 1, wherein the rotary joint is a cardanically acting rotary joint (6).

3. The pneumatic spring and damper unit as claimed in claim 2, wherein the piston rod (5) is mounted in an articulated fashion within the piston (7), the piston being partially embodied as a hollow element, and enclosing the piston rod (5) in its end region at a distance.

4. The pneumatic spring and damper unit as claimed in claim 3, wherein the housing (4) has at least two regions (8a, 8b) of different external diameters and one of the regions located near the front side (7a) of the piston has a greater external diameter than another one of the regions located around the hollow element formation.

5. The pneumatic spring and damper unit as claimed in claim 4, wherein a first rolling bellows (9) which forms a seal between the piston (7) and housing (4) and is opened to the front side (7a) of the piston and thus to the working space (2) arranged on the front side of the piston, and a second rolling bellows (10) which forms a seal between the piston and housing and is opened to the rear side (7b) of the piston and thus to the working space (3) arranged at the rear side of the piston, are arranged in the region (8a) of the larger external diameter, and in that a third rolling bellows (11) which forms a seal between the piston and the housing is arranged in the region (8b) of the smaller external diameter and is opened to the working space (3) arranged at the rear side (7b) of the piston and is arranged in a mirror-inverted fashion with respect to the second rolling bellows (8).

6. The pneumatic spring and damper unit as claimed in claim 5, wherein the first and second rolling bellows (9, 10) have essentially the same effective diameters (18, 19).

7. The pneumatic spring and damper unit as claimed in claim 5, wherein the external surface of the rotationally symmetrical piston is formed at least partially as a cone envelope in the region (8a) of the larger external diameter, and the first and second rolling bellows (9, 10) have different effective diameters (18, 19).

8. The pneumatic spring and damper unit as claimed in claim 7, wherein the effective diameter (18) of the first rolling bellows (9) is smaller than the effective diameter (19) of the second rolling bellows (10).

9. The pneumatic spring and damper unit as claimed in claim 5, wherein the respective effective diameters of the first and second rolling bellows are larger than the effective diameter (20) of the third rolling bellows (11).

10. The pneumatic spring and damper unit as claimed in claim 1, wherein the housing (4) has an upper region which is adapted to be fixed to a vehicle body and wherein the piston rod (5) has a lower region which is adapted to be attached to a wheel suspension.

* * * * *